United States Patent [19]
Mastain et al.

[11] Patent Number: 6,016,242
[45] Date of Patent: Jan. 18, 2000

[54] NARROW TOP POLES FOR INDUCTIVE MAGNETIC HEADS, MASKS AND PROCESSES FOR MAKING THE SAME

[75] Inventors: Steven A. Mastain, Chanhassen; Wallace A. Peck, Eagan; Diana M. Simplair, Savage; Kurt A. Rothstein, Bloomington, all of Minn.

[73] Assignee: Seagate Technology, Inc., Scotts Valley, Calif.

[21] Appl. No.: 09/134,779

[22] Filed: Aug. 13, 1998

Related U.S. Application Data

[60] Provisional application No. 60/078,882, Mar. 20, 1998.

[51] Int. Cl.[7] .............................. G11B 5/187; G11B 5/23
[52] U.S. Cl. ........................................... 360/119; 360/122
[58] Field of Search ..................................... 360/119–126

[56] References Cited

U.S. PATENT DOCUMENTS

| | | | |
|---|---|---|---|
| 5,245,493 | 9/1993 | Kawabe et al. | 360/126 |
| 5,446,613 | 8/1995 | Rottmayer | 360/113 |
| 5,452,164 | 9/1995 | Cole et al. | 360/113 |
| 5,559,654 | 9/1996 | Das | 360/126 |
| 5,649,351 | 7/1997 | Cole et al. | 29/603.14 |
| 5,719,730 | 2/1998 | Chang et al. | 360/113 |
| 5,752,309 | 5/1998 | Partee et al. | 29/603.18 |
| 5,804,085 | 9/1998 | Wu et al. | 216/22 |
| 5,831,801 | 11/1998 | Shouji et al. | 360/126 |
| 5,854,727 | 12/1998 | Tanaka et al. | 360/125 |
| 5,867,890 | 2/1999 | Hsiao et al. | 29/603.14 |
| 5,898,540 | 4/1999 | Matuyama et al. | 360/103 |

*Primary Examiner*—William J. Klimowicz
*Attorney, Agent, or Firm*—Kinney & Lange

[57] ABSTRACT

A mask forms a top magnetic pole piece of an inductive magnetic head having a layer of insulating material over a hill region and a gap region on a wafer. The mask comprises a layer of photolithographic material on the insulating material and a waste region of the wafer and includes a first aperture exposing the insulating material to define a paddle region of the pole piece over the hill region and a trench over the gap region. A second aperture is connected to the first aperture to define a feeder region over the waste region that funnels solvent to and through the trench and establishes laminar flow of solvent through the trench. Solvent is admitted into the feeder region for laminar flow through the trench region to form the mask and expose a surface of the layer of insulating material in the paddle and trench regions of the mask. The top pole piece defines a gap at an air bearing surface of the head having an average gap width not greater than 1.0 microns with a standard deviation of the average gap widths no more than 0.07 for heads formed on a single wafer and no more than 0.12 for heads formed on different wafers.

6 Claims, 4 Drawing Sheets

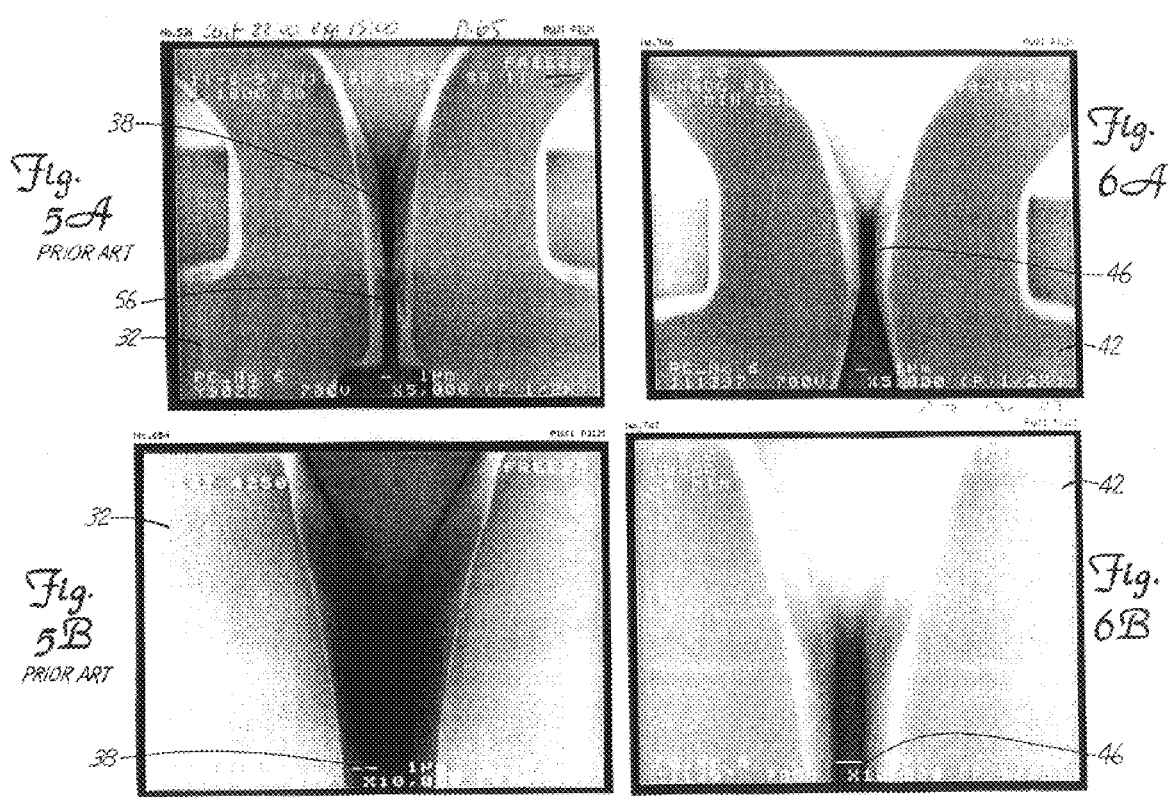

NARROW TOP POLES FOR INDUCTIVE MAGNETIC HEADS, MASKS AND PROCESSES FOR MAKING THE SAME

CROSS-REFERENCE TO RELATED APPLICATION

This application claims priority of Provisional Application No. 60/078,882 filed Mar. 20, 1998 for "High Aspect Ratio (Narrow Trench) Proximity Correction Design" by Steven A. Mastain, Wallace A. Peck, Diana M. Simplair and Kurt A. Rothstein.

BACKGROUND OF THE INVENTION

Thin film inductive heads are used to read and write data to and from an adjacent disc surface. Typically, the inductive head includes a top and bottom magnetic pole separated by a gap of insulating material, with a conductive coil embedded in the insulating material of the gap distal from the air bearing surface (ABS) of the head. Typically, the bottom pole and insulating gap are not of critical dimension to the width of the recording track, as the track width is defined by the width of the top magnetic pole at the air bearing surface. (Of course, the thickness of the insulating material forming the gap is critical since it defines the bit length of the recorded track.)

The elements of the thin film inductive head are usually formed by a photolithographic process. The photolithographic mask defining the top pole piece includes a trench that extends from the paddle region of the pole (where the coils form a hill in the insulating material) to the ABS. The trench defines the width of the top pole piece at the ABS, and hence the width of the track. As track width dimensions become smaller and the radial track density (number of tracks per inch) increases, the aspect ratio of the trench pattern in the photoresist forming the top pole piece becomes increasingly critical. More particularly, the top pole is created by depositing the magnetic material into the trench in the photolithographic mask formed on the insulating layer. If the trench is not well defined, or if it includes debris, the resulting top pole piece is not well defined at the ABS, leading to adverse operation of the head. Typically, the photolithographic mask is quite thick (about 13 microns) compared to the width of the mask trench at the gap (typically less than about 2 microns).

The photolithographic mask is ordinarily formed by spinning the photolithographic material, such as a photoresist, onto the insulating layer of the head to a thickness of about 13 microns. The coil configuration within the head forms a sloped hill portion to the insulating layer having a raised portion (where the paddle region of the top pole will be placed) and sloping downhill to the gap at the ABS. In forming the mask, the photoresist is spun over the hill, including on the slope, and past the intended ABS to a waste area. The photolithographic material is then patterned to the shape of the desired pole over the insulating material, to define the paddle and gap regions of the pole and a feeder region in the waste area. The photolithographic material is then exposed and thereafter washed out with a solvent. Typically, the solvent is applied to the exposed portions of the photoresist at the paddle region and in the feeder region and allowed to flow from the feeder region, through the trench area and into the paddle region. However, the flow of the solvent through the trench region of the photoresist often creates residue in that trench region, resulting in a poorly defined trench and adversely affecting the deposit of magnetic material within the trench to define the gap at the air bearing surface. As a result, when the head is later diced and milled at the ABS, unwanted residue within the mask inhibits proper formation of the magnetic pole at the gap, resulting in unacceptable performance of the head.

To achieve a well-defined, acceptably clear trench for formation of the gap region of the top pole piece, the solvent must be evenly applied to the photolithographic mask material. This requirement has heretofore been a limiting factor on the width of the trench, and hence the width of the top pole piece at the ABS. For this reason, it is not been practical, prior to the present invention, to achieve gap widths for inductive magnetic heads less than about 1.8 microns. We have discovered, however, that trenches with smaller widths and higher aspect ratios (height to width) can be achieved by applying a laminar flow of the solvent through the trench.

BRIEF SUMMARY OF THE INVENTION

In accordance with one form of the invention, a mask forms a top magnetic pole piece of an inductive magnetic head on a wafer. The magnetic head has a layer of insulating material over a hill region and a gap region, and the mask comprises a layer of photolithographic material on the insulating material and a waste region of the wafer. The mask comprises an aperture exposing the insulating material to define a paddle region of the pole piece over the hill region and a trench over the gap region. Means connected to the aperture defines a feeder region over the waste region that provides laminar flow of solvent from the feeder region to and through the trench.

In one embodiment of this form of the invention, the means defining the feeder region comprises a second aperture having walls for funneling solvent in a non-turbulent flow into and through the feeder region.

In another form of the invention, the top magnetic pole of an inductive magnetic head is formed on a wafer by forming a photolithographic material on the wafer that extends over the layer of insulating material at the hill region and gap region of the inductive magnetic head and over the waste region of the wafer. A mask is patterned on the photolithographic material to define a paddle region over the hill region, a feeder region over the waste region, and a trench region extending over the gap region between the feeder region and the paddle region. Solvent is admitted into the feeder region to flow in a laminar flow through the trench region to the paddle region to form the mask and expose a surface of the layer of insulating material in the paddle and trench regions of the mask.

In a preferred embodiment of this form of the invention, the feeder region includes walls tapered to funnel solvent into the trench region in a nonturbulent flow. Optimally, the trench region has an average width not greater than 1.0 microns. In one form of the invention magnetic material is deposited on the exposed surface of the layer of insulating material, and the waste region of the wafer, including magnetic material deposited on the waste region, may be removed to define an air bearing surface of the head at the gap region.

In another form of the invention, the mask and process from a top pole piece of an inductive magnetic head, wherein the top pole piece defines a gap width at an air bearing surface having an average track width not greater than 1.0 microns. Optimally, the standard deviation of the average gap widths of magnetic heads is no more than 0.07 for heads formed on a single wafer and no more than 0.12 for heads formed on different wafers.

BRIEF DESCRIPTION OF THE DRAWINGS

FIGS. 5A and 5B are microphotographs of the trench portion of the mask illustrated in FIG. 2.

FIGS. 6A and 6B are microphotographs of the trench portion of the mask illustrated in FIG. 4.

DETAILED DESCRIPTION

Figure 1:
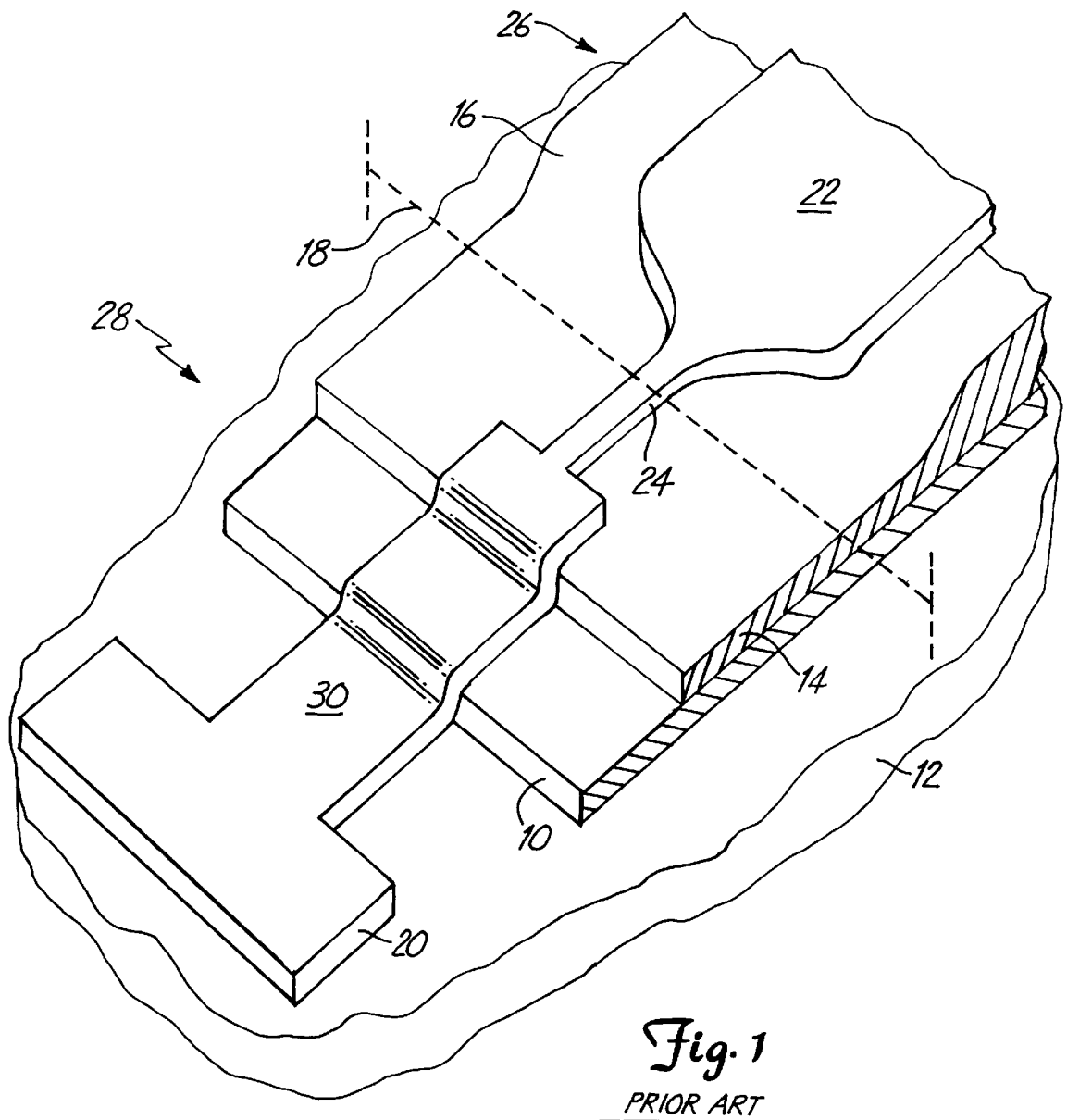
FIG. 1 is a perspective view of the magnetic material of the top pole piece of an inductive magnetic head formed with a mask mechanism in accordance with the prior art.

FIG. 1 is a perspective view of a portion of the top pole of a prior art thin film inductive head formed of a layer 10 of magnetic material on substrate 12.

The magnetic material may be any suitable magnetic material such as a nickel-iron alloy known as Permalloy. A layer of insulating material such as alumina ($Al_2O_3$) or silica ($SiO_2$) is formed on layer 10. Layer 14 is usually recessed from layer 10 in a waste region as illustrated. Insulating layer 14 forms a hill portion 16 due to the presence of portions of loops of the conductive coil (not shown) distal from the eventual air bearing surface (ABS), illustrated by line 18. Also, typically, while insulating layer is illustrated as a single layer, in fact it is plural layers due to the embedded coils.

At the plane of the eventual ABS, the thickness of layer 14 is typically less than 1 micron. A photoresist mask (not shown) is formed over the exposed surfaces of substrate 12 and layers 10 and 14 and patterned to define the top pole of the head, including the gap region of the pole, as well as a region in the waste portion. A magnetic material is deposited to a thickness of about 2 to 3 microns, thereby forming pole layer 20 having a paddle section 22 extending over the hill 16 of the head and tapering to a narrow neck or gap width 24 at air bearing surface 18. The magnetic head is formed on a wafer with a plurality of other magnetic heads such that portion 26 of the structure to the upper right of air bearing surface 18 (in FIG. 1) forms the magnetic head, while that portion 26 to the lower left of surface 18 (in FIG. 1) is a waste portion of the wafer that is discarded. As illustrated in FIG. 1, layer 20 includes a region 30 in the waste section such that the neck portion 24 connects the waste section 30 and paddle region 22.

After completion of the head, including encapsulation, the head portion is diced from the wafer, ordinarily at a point on the waste portion near the air bearing surface 18, and waste portion 28 of the wafer is discarded. The resulting edge surface is lapped smooth to the desired air bearing surface 18, thereby completing the head.

Figure 2:
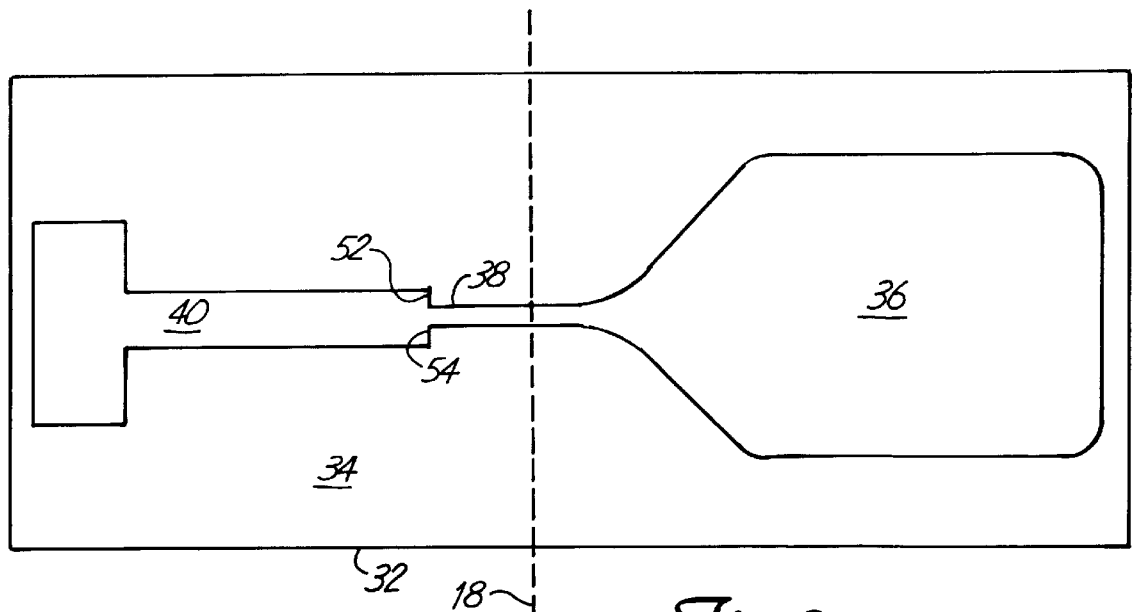
FIG. 2 is a top view of a mask structure for forming the pole piece illustrated in FIG. 1.

FIG. 2 illustrates a mask 32 used to form the top pole layer 20 illustrated in FIG. 1. Typically, the mask comprises a layer of photoresist, ordinarily of the order of about 13 microns, having apertures 36, 38 and 40 corresponding to the paddle region, 22, gap region 24 and region 30 of the layer of magnetic material illustrated in FIG. 1. Mask 32 is constructed by depositing photoresist onto the exposed surfaces of substrate 12, lower pole layer 10 and insulating layer 14 illustrated in FIG. 1. The photoresist is then patterned and exposed to light at regions 36, 38 and 40 and a solvent is employed to dissolve and wash the photoresist out from regions 38 and 36. Gap width 38, along the length of line 18 (which defines the air bearing surface), is about 1.8 to 2.5 microns. To dissolve the photoresist in that region, the solvent is admitted into region 40 and permitted to flow through the trench 38 into the paddle region 36, thereby clearing the trench.

Figure 3:
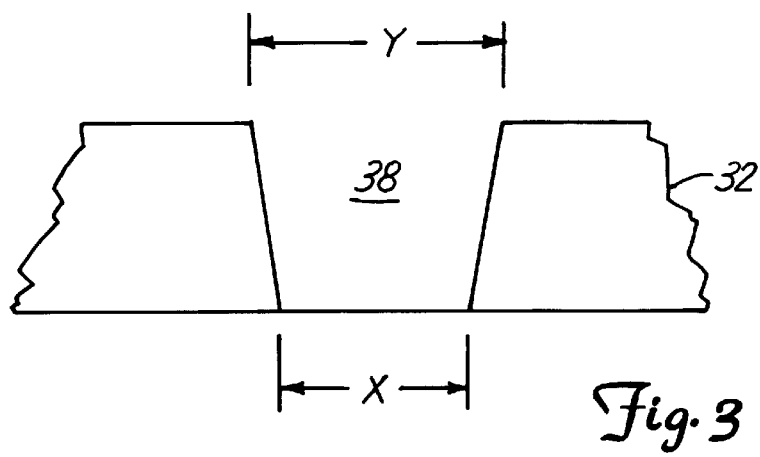
FIG. 3 is a section view of the trench portion of a mask that forms the eventual gap of a thin film magnetic head.

Due to the exposure to light and the flow of solvent through trench region 38, the trench region takes on a somewhat trapezoidal shape, as illustrated in FIG. 3. More particularly, the trench tends to be wider at the top than it is at the bottom, designated by dimensions Y and X, respectfully. The magnetic material forming the top pole is typically deposited to a thickness of about 2 to 3 microns in a trench having a depth of about 13 microns (mask thickness). The difference of the width between the top and bottom of the trench (Y-X) is typically about 3.25 microns. For a pole having an average width of 2.0 microns, the actual width will be between about 1.6 microns at the bottom (X) and 2.4 microns at the top. Hence, the gap width of the pole piece varies by about 0.75 microns between the top and the bottom of the pole, depending upon the thickness of the pole. The top of the trench (Y) will be about 4.8 microns wide. Hence, the average width of the trench equals approximately one-half the sum of X and Y, and for a 2 micron wide (average) pole is about 3.2 microns.

In prior heads, the standard deviation ($1\Sigma$) of the average width of the top pole at the gap is about 0.15 for heads on the same wafer and about 0.18 for heads on different wafers, based on quad average. Thus, for heads having top poles having a nominal average width of 2.0 microns, the heads produced from a single wafer within the standard deviation have average gap widths between 1.85 and 2.15 microns, and heads of different wafers within the standard deviation have an average width between 1.82 and 2.18 microns. This deviation, of course, affects the ability to standardize the recording and reading features of inductive heads and the widths of the recording track. Deviations as much as 0.18 for heads made on different wafers can affect calibration of the electronics associated with the magnetic disc drive, as well as data recording qualities and densities.

Figure 4:
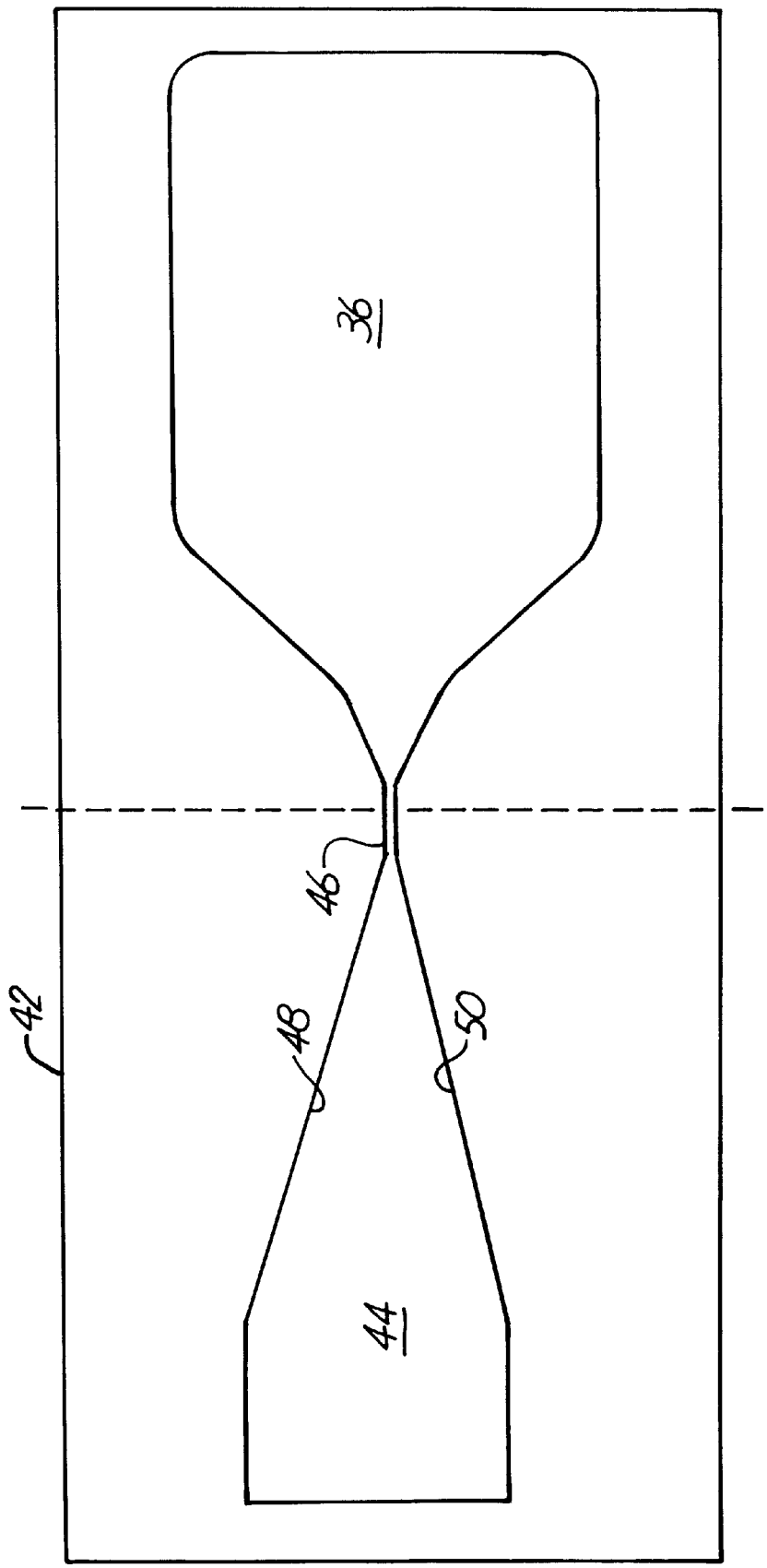
FIG. 4 is a top view illustrating a mask for forming a top pole piece of an inductive magnetic head in accordance with the present invention.

The present invention is directed to an improved top pole piece for an inductive magnetic head, and process for making the same, as illustrated by the mask illustrated in FIG. 4. In FIG. 4, mask 42, is formed by depositing a layer of photoresist material on the exposed surfaces of the substrate, lower pole and insulating layer as in FIG. 1. The photoresist layer is patterned and exposed, in a manner similar to the patterning and exposing of the mask of FIG. 2, forming the paddle region 36 (identical to paddle region 36 of FIG. 2), a feeder region 44 in the waste area of the wafer, and a trench 46 connected between feeder region 44 and paddle region 36.

There are two principal features of mask 42: First, feeder region 44 includes sloped surfaces 48 and 50 that act as a funnel into trench region 46. The sloped surfaces are arranged so that solvent flows into and through trench region 46 from the feeder region in a substantially laminar, or non-turbulent, flow. Thus, where feeder region 40 of the mask illustrated in FIG. 2 includes shoulders 52 and 54 that generate turbulence in the solvent flow entering the trench region, feeder region 44 provides a laminar flow directly into the trench region 46. We have found that by controlling the flow of solvent to a laminar flow, better control is made of the flow of solvent through the trench region reducing the amount and likelihood of residue accumulating in the trench. Consequently, when the magnetic material is later deposited in the completed mask to form the top pole piece, there is a less likelihood of residue adversely affecting the quality of the head.

The second principal feature of the present invention is that the trench region has widths averaging much smaller than in prior masks (e.g., less than 1.0 micron) with a smaller standard deviation. More particularly, we theorize that the laminar flow of solvent through the trench region of mask 42 illustrated in FIG. 4 permits formation of trench widths smaller than previously possible, with better characteristics than larger trench regions of the prior art. For example, heads having pole pieces manufactured in accordance with the present invention exhibiting an average width of 1.0 microns exhibited a standard deviation (1 Σ) of 0.07 for heads produced on a single wafer and of 0.12 for heads produced on different wafers, based on quad average. Hence, for heads having top poles having a nominal average width of 1.0 microns, the heads of a single wafer within the standard deviation had an average width between 0.965 and 1.035 microns and heads of different wafers within the standard deviation had an average width between 0.94 and 1.06 microns.

Prior to the present invention, it had not be possible to achieve inductive magnetic heads with an average gap width of about 1.0 microns, or less, on a production level. The present invention achieves narrower gap widths than previously achieved through use of the sloped surfaces of the feeder region of the mask and the narrower trench region. The trench region has a trapezoidal shape, as in prior trenches, but with narrower bottoms and tops. Thus, the trench of a 13 micron thick mask to produce a pole having an average width of 1.0 microns and 3 microns thick has a bottom dimension of about 0.6 microns and a top dimension of about 3.8 microns with an average trench width of about 2.2 microns. Such a mask will produce a pole having a thickness of 3 microns and a width that varies between 0.6 microns at the bottom and 1.4 microns at the top (average, 1.0 microns).

FIG. 5A is a microphotograph of the trench region 38 of mask 32 illustrated in FIG. 2 enlarged by a factor of 5,000 (5,000×). FIG. 5B is a microphotograph of a portion of the same trench region 38 illustrated in FIG. 2 at 10,000×. For comparison, FIG. 6A is a microphotograph at 5,000× of the trench region 46 of mask 42 illustrated in FIG. 4, and FIG. 6B is a microphotograph at 10,000× of a portion of the same trench region 46 of FIG. 4. FIG. 5A illustrates a collection of residue 56. If that residue remains in the head after severance at the air bearing surface, that residue may adversely affect the performance of the head. FIG. 6A demonstrates the reduction of residue from trench 46.

A comparison of FIGS. 5B and 6B reveals the sloped walls of the mask, diagrammatically viewable in FIG. 3, and illustrates that at the air bearing surface more narrow gap widths are possible with the present invention (FIG. 6B) than with the prior art (FIG. 5B).

Although the present invention has been described with reference to preferred embodiments, workers skilled in the art will recognize that changes may be made in form and detail without departing from the spirit and scope of the invention.

We claim:

1. A wafer containing a plurality of inductive magnetic heads each having a bottom pole piece and a top pole piece defining a gap at an air bearing surface, the top pole piece defining a gap width such that an average of the gap widths of the plurality of magnetic heads is not greater than 1.0 microns with a standard deviation of the average gap widths of the plurality of heads on the wafer being no more than 0.07, formed by;

patterning a mask in a layer of photolithographic material on a layer of insulating material on the wafer, the mask pattern defining a plurality of paddle regions, feeder regions, and trench regions between respective feeder regions and paddle regions, the paddle regions being over a respective hill region of respective ones of the magnetic heads, the feeder regions being over a waste region of the wafer, and the trench regions extending over respective gap regions of respective ones of the magnetic heads;

forming the mask by flowing solvent in a laminar flow through the trench regions from the respective feeder regions to the respective paddle regions to expose a surface of the layer of insulating material in the paddle and trench regions of the mask, the trench region having an average width no greater than 1.0 microns; and placing a magnetic material on the layer of insulating material in the mask in the paddle and trench regions to form the top pole pieces of the plurality of heads.

2. The invention of claim 1, wherein there are a plurality of wafers, each wafer containing a plurality of heads, and the standard deviation of the average gap widths of the plurality of heads on the plurality of wafers is no more than 0.12.

3. The wafer of claim 1, wherein the feeder regions patterned in the mask defining the top pole pieces include walls tapered to funnel solvent into the trench regions in a non-turbulent flow.

4. The wafer of claim 3, wherein the top pole pieces of the inductive magnetic heads are characterized by an absence of residue of photolithographic material in respective necks of the respective top pole pieces.

5. The wafer of claim 1, wherein the air bearing surfaces are defined at the gap regions by removing the waste region of the wafer, including magnetic material deposited on the waste region.

6. The wafer of claim 1, wherein the top pole pieces of the inductive magnetic heads are characterized by an absence of residue of photolithographic material in respective necks of the respective top pole pieces.

* * * * *